Figure 10:
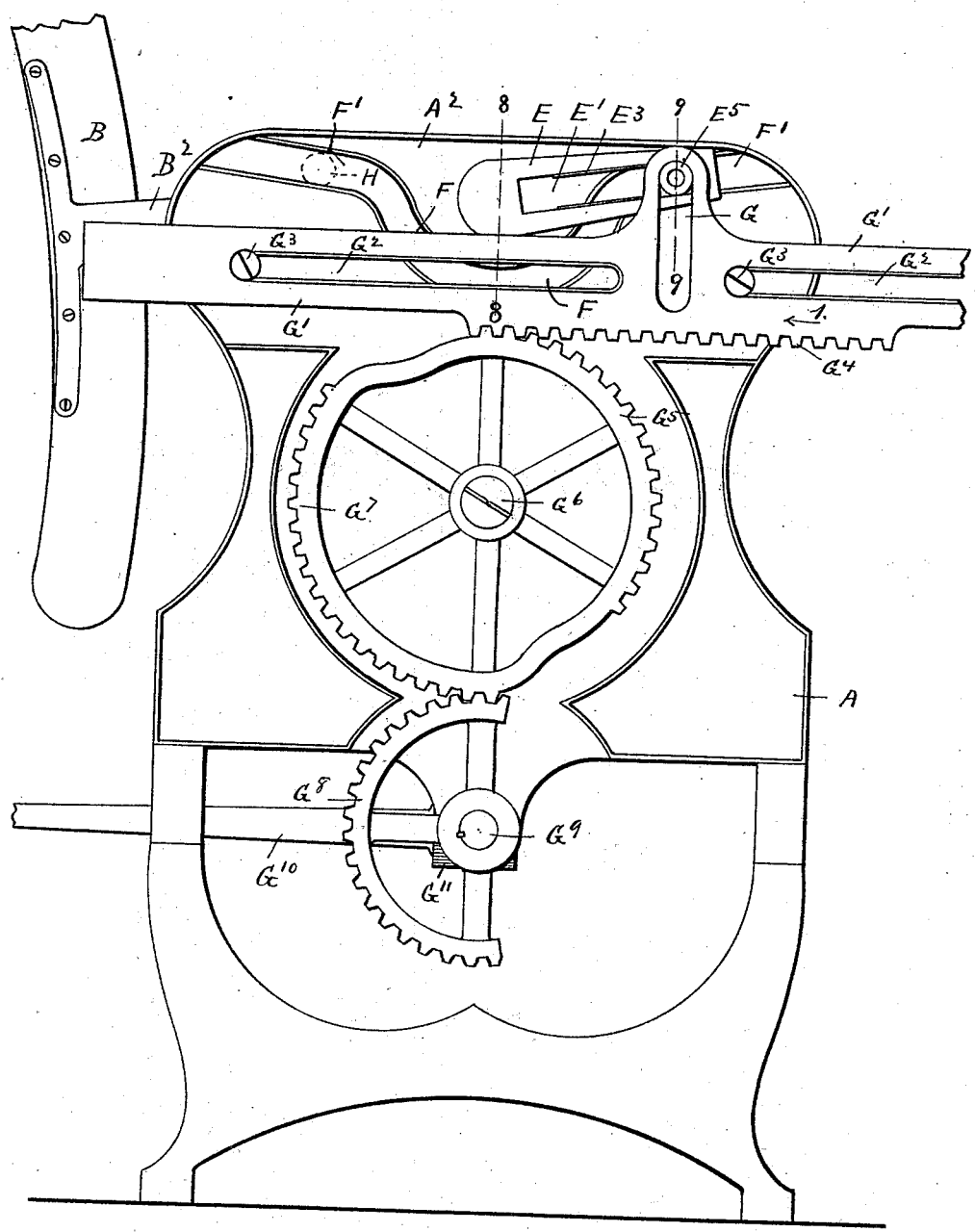

(No Model.) 2 Sheets—Sheet 1.
J. S. WINSOR.
APPARATUS FOR LOCKING AND TURNING CAR SEATS.
No. 519,370. Patented May 8, 1894.
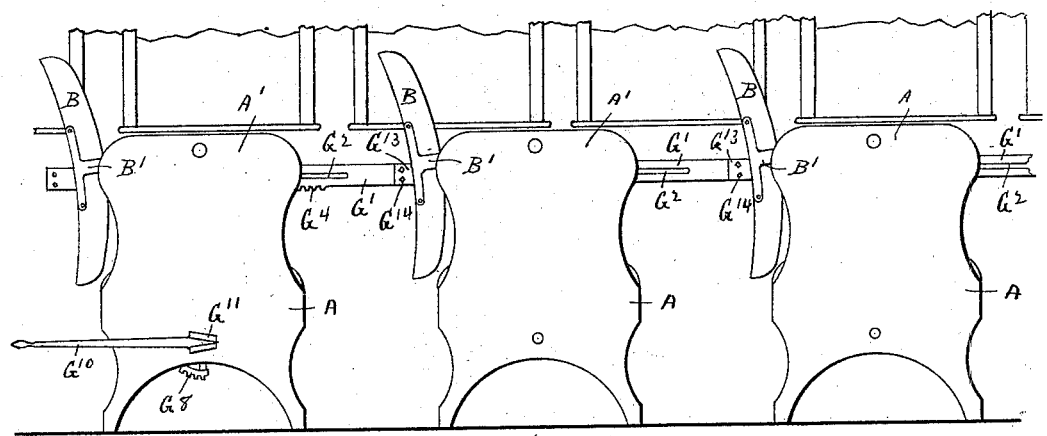
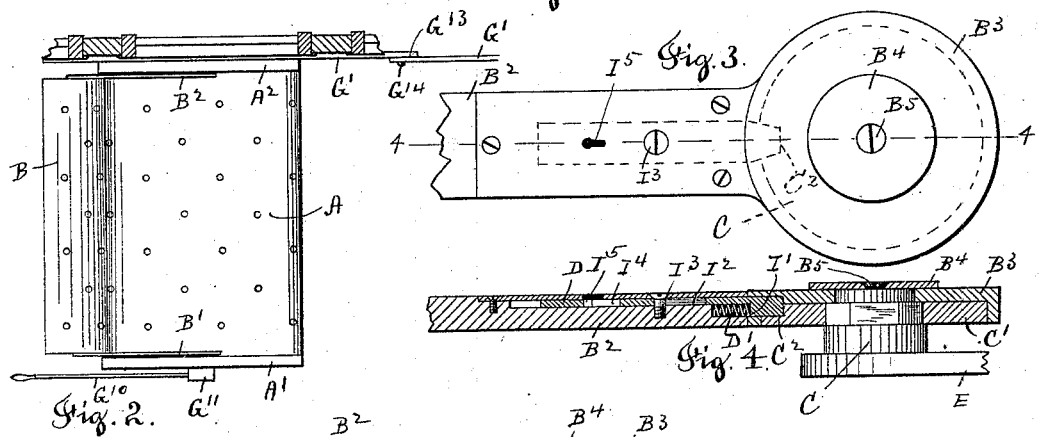
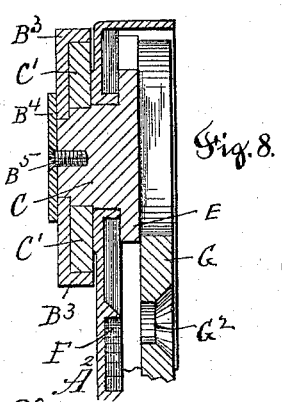
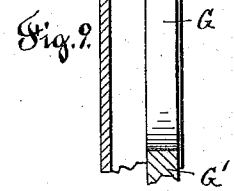
Witnesses
A. C. Whiting.
Emma Kester.
Inventor
Joseph S. Winsor.
By his Attorney
Rufus B. Fowler.
THE NATIONAL LITHOGRAPHING COMPANY,
WASHINGTON, D. C.

UNITED STATES PATENT OFFICE.

JOSEPH S. WINSOR, OF WORCESTER, MASSACHUSETTS, ASSIGNOR OF ONE-HALF TO OSGOOD BRADLEY, OF SAME PLACE.

APPARATUS FOR LOCKING AND TURNING CAR-SEATS.

SPECIFICATION forming part of Letters Patent No. 519,370, dated May 8, 1894.

Application filed July 7, 1893. Serial No. 479,856. (No model.)

*To all whom it may concern:*

Be it known that I, JOSEPH S. WINSOR, a citizen of the United States, residing at Worcester, in the county of Worcester and State of Massachusetts, have invented a new and useful Improvement in Apparatus for Locking and Turning Car-Seats, of which the following is a specification, reference being had to the accompanying drawings, representing the apparatus embodying my invention, and in which—

Figure 1 represents three car seats shown in end elevation; that end of the seat being shown next the center aisle of the car. Fig. 2 represents a top view of a car seat. Fig. 3 shows a portion of the pivoted lever by which the seat back is supported. Fig. 4 is a sectional view on line 4, 4, of that portion of the lever represented in Fig. 3. Fig. 5 is a detached view of the short rotating spindle journaled in the arm of the seat. Fig. 6 is a detached view of the sliding bolt by which the seat back is locked in position. Fig. 7 is a detached view of the rotating shaft journaled in the frame-work of the seat to which the lever handle is applied, by which the seat turning apparatus is actuated. Fig. 8 is a sectional view on line 8, 8, Fig. 10. Fig. 9 is a sectional view on line 9, 9, Fig. 10 and Fig. 10 shows on an enlarged scale an elevation of the end of the seat next the side of the car, showing the operating mechanism by which the seat back is turned.

Similar letters refer to similar parts in the different figures.

My present invention has for its object to provide an apparatus by which the backs of all the car seats upon one side of the car can be simultaneously turned and also to provide a locking mechanism by which the back of each seat can be locked in position, or disconnected from the turning mechanism to allow it to be turned independently.

Referring to the accompanying drawings A, A, A, denote car seats arranged in a row upon one side of the car.

B denotes the backs attached to levers B', B², which are pivoted to the arms A', A² of the seats, allowing the backs to be turned so as to face in opposite directions in the usual manner. The lever B' is pivoted in the arm A' next the center aisle of the car in the usual manner and the lever B² is connected with a short rotating spindle C journaled in the arm A² next the side of the car as hereinafter described. The short rotating spindle C shown in detached view in Figs. 4 and 5, is journaled in the arm A² as represented in sectional view in Fig. 8, and is provided at its inner end with a disk C' securely attached to the spindle. The inner end of the lever B² is circular and cup-shaped, as represented at B³ in Fig. 3 and in central sectional view in Fig. 4, the cup-shaped end B³ fitting like a cap over the disk C' and held in place by a washer B⁴ and screw B⁵ entering the spindle C so the lever B² is capable of turning about the disk C', except when locked in position by means of the sliding bolt D, shown in detached view in Fig. 6, which is carried within a chamber in the lever B² and is actuated by a spring D', Fig. 4, which presses the end of the bolt into a notch C² in the edge of the disk C, thereby locking the lever B² and disk C' together, so the lever B² and connected back B of the seat will be rotated, or turned over by the rotation of the spindle C. Upon the outer end of the spindle C is attached a radial arm E placed between the seat arm A² and the side of the car. The arm E is provided with a slot E' having V-shaped ways E³ to receive a sliding block E², which carries upon one side a friction roll E⁴, Figs. 5 and 9, running in a curved groove F formed in the frame-work of the seat and upon the opposite side a roll E⁵, which runs in the vertical slot G in the sliding rack G'. The rack G' is provided with horizontal slots G² inclosing screws G³ which are held in the frame-work of the seat, serving as guides upon which the rack moves. The teeth G⁴ of the rack are engaged by the segmental gear G⁵ rotating about the pivotal stud, or screw, G⁶ held in the frame-work of the seat and actuated by means of the segmental gear G⁷ and half gear G⁸ which is carried upon a shaft G⁹, journaled in the frame-work of the seat and adapted to receive a lever G¹⁰, by which the shaft G⁹ can be turned one-half a revolution, causing the sliding rack G' to be moved along the screws G³. The motion of the rack G', in the direction of the arrow 1, Fig. 10, will cause the slotted arm E and connected spindle C to be rotated, the sliding block E² moving within the slot E' to allow for the variation in the radial distance of the curved groove F, from the axis of the spindle C, the roll E⁴ moving along the curved groove F to the position indicated by the broken lines H, Fig. 10 and the roll E⁵ moving first downward and then upward in the vertical slot G. The curvature of the central section of the groove F is eccentric to the axis of the spindle C, so the sliding block E² will move radially nearest the spindle C, midway its rotation and when the back of the seat is raised in a horizontal position midway its movement and the groove F is provided at its ends with the straight sections F', F', within which the roll E⁴ rests at each end of the rotative movement of the arm E and as the straight sections F' are not tangential to the central curved section of the groove F the arm E and spindle C, in the position shown in Fig. 10 will be held against rotation from a force applied to the back of the seat.

The inner end of the shaft G⁹ carries a plate G¹¹ attached thereto provided with a tapering socket G¹² to receive the end of the lever G¹⁰, but I do not confine myself to this particular method of connecting the lever G¹⁰ with the shaft G⁹ as the end of the shaft can be square to receive the lever, or a crank handle can be applied thereto. The shaft G⁹, half gear G⁸, segmental gears G⁵ and G⁷ and rack teeth G⁴, form the operative mechanism by which the rack bar G' is operated and as the rack bar G' is a continuous bar extending along the side of the car, throughout the entire row of seats, this operative mechanism is omitted from the remaining car seats in the row. The connection of the rack bar G' with the slotted arms E and backs of the seats is, however, repeated at each seat in the same manner as already described, so the longitudinal movement of the rack G' will serve to turn the backs of all the connected seats in the row. I prefer to make the rack-bar G' in sections, with the ends of the sections overlapping between each seat as at G¹³ and being connected by bolts G¹⁴, thereby allowing the distance between the seats to be varied. The segmental gears G⁵ and G⁷ are of different radii, but are formed upon a single wheel, in order to secure an increased leverage, with a single thickness of gear capable of being contained within the limited space in the frame-work of the seat.

The locking mechanism by which the lever B² is connected with the disk C', is clearly illustrated in Figs. 3, 4 and 6. The sliding bolt D is provided with a beveled end I adapted to enter the notch C² in the disk C and with a shoulder I' against which the spring D' acts to force the end I of the bolt into the notch; the bolt D is also provided with a slot I² to receive a screw I³ held in the lever B² and with a hole I⁴ situated beneath a key hole I⁵ in the lever B². In order to withdraw the bolt D from the notch C², a key is inserted through the key hole I⁵ and rotated against the side of the hole I⁴, sliding the bolt against the tension of the spring D' and withdrawing it from the notch C², when a slight rotation of the lever B² will cause the end I of the bolt D to ride upon the edge of the disk and be held out of engagement allowing the back of the seat to be turned independently. When the back of one of the seats has thus been unlocked and turned over, if the disk C' be rotated half a revolution, by means of the rack G' and connected mechanism, the notch C² will again be brought into alignment with the end of the sliding bolt D, which will be forced into the notch by the action of the spring D', thereby automatically locking the back in a position corresponding with that of the backs of the remaining seats.

What I claim as my invention, and desire to secure by Letters Patent, is—

1. The combination with the fixed arms of a car seat, of a spindle journaled in one of said arms, connected operative mechanism, by which said spindle is rotated, a circular disk attached to the end of said spindle, levers pivoted concentrically with said spindle and carrying a seat back; one of said levers inclosing said disk and a clutching device carried by said lever and arranged to engage said disk, substantially as described.

2. The combination with the fixed arms of a car seat, of a spindle journaled in one of said arms, a disk attached to said spindle, levers pivoted concentrically with said spindle and carrying a seat back, a sliding bolt held in one of said levers and arranged to engage said disk and a spring applied to said bolt to carry it into engagement with said disk, substantially as described.

3. The combination with the arms of a car seat, of spindles journaled in said arms, levers carrying a seat back and operatively connected with said spindles, an arm attached to one of said spindles and provided with a radial slot, a sliding block sliding in said slot, a friction roll carried by said sliding block, a sliding bar provided with a slot at right angles with the line of its motion, said slot inclosing said friction roll, a curved track in the arm of the seat, by which the movement of the sliding block is controlled in the radial slot of the spindle arm, substantially as described.

4. The combination with the arms of a car seat, of spindles journaled in said arms, levers operatively connected with said spindles and carrying a seat back, an arm attached to one of said spindles and provided with a radial slot forming ways for a sliding block, a friction roll carried upon one side of said sliding block, a curved track in the seat arm inclosing said friction roll, a second friction roll carried upon the opposite side of said block, and a sliding bar provided with a slot at right angles to its line of motion inclosing said friction roll, whereby said spindle is rotated by the longitudinal movement of said bar, substantially as described.

5. The combination with a rotating spindle, a pivoted seat back operatively connected with said spindle, a radial arm attached to said spindle, a sliding rack operatively connected with said radial arm, a gear provided with two segmental sections of gear teeth of different radii, one of said segments engaging said rack and the other of said segments engaging an actuating gear, substantially as described.

6. The combination with the fixed arms of a car seat, of a spindle journaled in one of said arms, a pivoted seat back connected with said spindle, a radial arm attached to said spindle and operative mechanism, by which an angular motion is imparted to said radial arm, a block capable of sliding radially in said arm, a roll carried by said block and a curved track in the frame of the car seat and having at its ends straight sections which are non-tangential to its curved section, in which said friction roll is held against a force applied to the seat back to rotate said radial arm, substantially as described.

7. The combination with the seat arm $A^2$, of a spindle C journaled in said arm, a pivoted seat back connected with said spindle, an arm E provided with a slot $E'$, a block $E^2$ capable of sliding in said slot, a roll $E^4$ carried by said block and running in a curved track in said seat arm, a roll $E^5$ carried by said block, a sliding bar $G'$ having a slot G inclosing said roll $E^5$, substantially as described.

Dated this 30th day of June, 1893.

JOSEPH S. WINSOR.

Witnesses:
RUFUS B. FOWLER,
EMMA KESTER.